(12) United States Patent
Aller et al.

(10) Patent No.: US 9,894,845 B2
(45) Date of Patent: Feb. 20, 2018

(54) MODULAR MAGNETIC CONTAINER SYSTEM

(75) Inventors: Jared Aller, Oakland, CA (US); Beau Oyler, Walnut Creek, CA (US); Yi Cui, Oakland, CA (US)

(73) Assignee: Honey-Can-Do International, LLC, Berkeley, IL (US)

( * ) Notice: Subject to any disclaimer, the term of this patent is extended or adjusted under 35 U.S.C. 154(b) by 162 days.

(21) Appl. No.: 14/008,550

(22) PCT Filed: Mar. 28, 2012

(86) PCT No.: PCT/US2012/030987
§ 371 (c)(1),
(2), (4) Date: Feb. 13, 2015

(87) PCT Pub. No.: WO2012/135370
PCT Pub. Date: Oct. 4, 2012

(65) Prior Publication Data
US 2015/0164003 A1    Jun. 18, 2015

Related U.S. Application Data

(60) Provisional application No. 61/468,511, filed on Mar. 28, 2011.

(51) Int. Cl.
*A01G 9/02* (2006.01)
*A47G 7/04* (2006.01)
(Continued)

(52) U.S. Cl.
CPC .............. *A01G 9/02* (2013.01); *A01G 9/022* (2013.01); *A47G 7/044* (2013.01);
(Continued)

(58) Field of Classification Search
CPC B65D 21/0201; B65D 21/0205; B65D 25/22; A47G 7/044; A47G 2200/106
See application file for complete search history.

(56) References Cited

U.S. PATENT DOCUMENTS 1,096,180 A  *  5/1914  Meurling ................. A45F 5/08
                                                   24/5
1,402,904 A  *  1/1922  Skidmore ................ A45F 5/08
                                                  224/182
(Continued)

FOREIGN PATENT DOCUMENTS

JP    2002/199980    7/2002
JP    2003/246378    9/2003
WO    WO 2009/116895    9/2009

OTHER PUBLICATIONS

PCT International Search Report and Written Opinion in International Application PCT/US2012/030987, dated Jul. 13, 2012, 15 pgs.

*Primary Examiner* — Steven A. Reynolds
*Assistant Examiner* — James Way
(74) *Attorney, Agent, or Firm* — Adam K. Sacharoff; Much Shelist, P.C.

(57) ABSTRACT

A modular magnetic storage system including a container attachable to a surface, the container including a vessel having a top end, a bottom end, a wall and a magnet housing, the bottom end being positioned opposite to the top end, the wall extending between the bottom end and the top end, the wall and the bottom end defining a cavity, the top end defining an opening in the vessel, and the magnet housing defining a recess; a magnet disposed within the recess; and a resilient cover positioned over the magnet housing, the resilient cover providing a coefficient of friction between the resilient cover and the surface to maintain a position of the vessel on the surface.

11 Claims, 14 Drawing Sheets

(51) Int. Cl.
*B65D 21/02* (2006.01)
*B65D 25/22* (2006.01)

(52) U.S. Cl.
CPC ......... *B65D 21/0205* (2013.01); *B65D 25/22* (2013.01); *A47G 2200/106* (2013.01)

(56) References Cited

U.S. PATENT DOCUMENTS

| | | | |
|---|---|---|---|
| 2,427,416 A * | 9/1947 | Petersen | A47G 29/06 211/75 |
| 2,580,099 A * | 12/1951 | Jaeger | B25H 3/04 206/818 |
| 2,887,824 A * | 5/1959 | Riva | A47G 7/06 206/216 |
| 3,556,341 A * | 1/1971 | Rains | A47G 19/2272 206/818 |
| 3,767,104 A * | 10/1973 | Bachman | B65D 85/505 206/423 |
| 3,768,685 A * | 10/1973 | Eckman | B65D 23/12 215/386 |
| 4,405,108 A * | 9/1983 | Muirhead | A47F 5/0823 211/70.6 |
| 4,484,682 A | 11/1984 | Crow | |
| 4,616,750 A * | 10/1986 | Nouwen | B65D 21/0201 206/389 |
| D287,175 S | 12/1986 | Gecchelin | |
| D298,520 S * | 11/1988 | Pickering | D11/146 |
| 4,786,023 A * | 11/1988 | Harris | B43K 23/002 248/309.1 |
| 4,828,209 A * | 5/1989 | Niemi | F16B 19/1081 248/220.42 |
| D305,193 S | 12/1989 | Sajadieh | |
| D315,532 S * | 3/1991 | Belokin, Jr. | D11/146 |
| 5,037,107 A | 8/1991 | McArthur et al. | |
| D334,265 S | 3/1993 | Giugiaro | |
| 5,224,679 A * | 7/1993 | Code | A61C 13/10 128/852 |
| 5,368,203 A * | 11/1994 | Friedrich | A47G 19/24 206/818 |
| 5,544,747 A * | 8/1996 | Horn | B25H 3/06 206/350 |
| D374,312 S * | 10/1996 | Edgar | D28/73 |
| 5,871,107 A | 2/1999 | Johnson et al. | |
| 5,971,202 A * | 10/1999 | Filbrun | A47G 19/2211 220/719 |
| 6,065,632 A | 5/2000 | Moore, Jr. et al. | |
| 6,067,748 A * | 5/2000 | Williams | A47G 7/06 47/41.01 |
| 6,089,519 A * | 7/2000 | Laybourne | A47G 23/03 220/212 |
| D440,733 S * | 4/2001 | Williams | D99/19 |
| D448,299 S | 9/2001 | Negre | |
| 6,324,784 B1 * | 12/2001 | Bina | A47G 7/06 47/41.01 |
| D470,077 S * | 2/2003 | Osawa | D11/146 |
| D481,236 S | 10/2003 | Hunt | |
| D497,777 S | 11/2004 | Sanders et al. | |
| D506,644 S | 6/2005 | Poupel et al. | |
| 6,964,129 B2 * | 11/2005 | Fenwick | A01G 9/02 47/66.1 |
| 7,000,347 B2 * | 2/2006 | Roskin | A47G 7/07 206/423 |
| 7,010,935 B2 | 3/2006 | Citrynell et al. | |
| 7,017,768 B2 * | 3/2006 | Iskierka | A47G 19/2211 116/207 |
| D540,623 S | 4/2007 | Schreiber-Pethan et al. | |
| D543,788 S | 6/2007 | Hong | |
| D543,790 S | 6/2007 | Szymanski | |
| D551,502 S | 9/2007 | Bodum | |
| D563,693 S * | 3/2008 | Calleja | D6/682 |
| D563,733 S | 3/2008 | Wang | |
| D564,843 S | 3/2008 | Frank | |
| D564,844 S | 3/2008 | Schreiber-Pethan et al. | |
| 7,377,780 B2 * | 5/2008 | White | A61C 19/00 248/309.1 |
| D579,616 S | 10/2008 | Lion et al. | |
| D581,279 S | 11/2008 | Oates | |
| D581,738 S | 12/2008 | Bodum | |
| D588,913 S | 3/2009 | Bakic | |
| D590,564 S | 4/2009 | Dretzka | |
| D593,882 S | 6/2009 | Scalisi | |
| D594,277 S | 6/2009 | Snell | |
| D607,616 S | 1/2010 | Newsome et al. | |
| D611,769 S | 3/2010 | Hauser | |
| D612,732 S | 3/2010 | Takata et al. | |
| D613,127 S | 4/2010 | Olivari | |
| D613,999 S | 4/2010 | Sierra | |
| D614,917 S | 5/2010 | Calco | |
| D620,764 S | 8/2010 | Lessells | |
| D621,223 S | 8/2010 | Bas | |
| D621,665 S | 8/2010 | Lion et al. | |
| D622,553 S | 8/2010 | Bollenbacher | |
| 7,789,229 B2 * | 9/2010 | Frakes | B25H 3/02 206/350 |
| D626,791 S | 11/2010 | Sierra | |
| D628,340 S | 11/2010 | Krause | |
| D629,264 S | 12/2010 | Curtin | |
| D632,138 S | 2/2011 | Carter | |
| D634,165 S | 3/2011 | Yang | |
| 7,897,088 B2 | 3/2011 | Mitchell | |
| D640,248 S | 6/2011 | Baumann et al. | |
| D643,317 S | 8/2011 | Clear et al. | |
| 8,001,671 B2 | 8/2011 | Mitchell | |
| D646,852 S | 10/2011 | Chance et al. | |
| 8,033,420 B2 * | 10/2011 | Roseblade | A47G 19/2211 220/369 |
| D648,212 S | 11/2011 | Golota et al. | |
| D651,049 S | 12/2011 | Nakagawa | |
| D651,467 S | 1/2012 | Bodum | |
| D655,984 S | 3/2012 | Andreesen | |
| D661,948 S | 6/2012 | Bangert | |
| D661,989 S | 6/2012 | Praster | |
| D662,785 S | 7/2012 | Kern | |
| D667,240 S | 9/2012 | Weldon | |
| D676,710 S | 2/2013 | Kwok | |
| D680,812 S | 4/2013 | Justus et al. | |
| D685,230 S | 7/2013 | Hassman | |
| D685,608 S | 7/2013 | Bangert | |
| D685,610 S | 7/2013 | Bangert | |
| D698,568 S | 2/2014 | Chen | |
| D711,239 S | 8/2014 | Julier | |
| D717,116 S | 11/2014 | Aslon | |
| D717,608 S | 11/2014 | Lin | |
| D718,532 S | 12/2014 | Wang | |
| 9,010,530 B2 * | 4/2015 | Bowen | A61M 1/008 206/210 |
| 2004/0084593 A1 * | 5/2004 | Barfield | A47G 23/0225 248/311.2 |
| 2004/0173719 A1 | 9/2004 | Mitchell et al. | |
| 2005/0056646 A1 * | 3/2005 | Gary | A47G 19/2261 220/483 |
| 2005/0194507 A1 * | 9/2005 | White | A61M 1/0039 248/314 |
| 2007/0131695 A1 | 6/2007 | Hsing-Hsien | |
| 2007/0176070 A1 * | 8/2007 | Mitchell | A47G 23/0225 248/311.2 |
| 2008/0060204 A1 | 3/2008 | Chen | |
| 2009/0166243 A1 | 7/2009 | Cetera | |
| 2010/0071395 A1 | 3/2010 | LeDoux et al. | |
| 2010/0206825 A1 | 8/2010 | Johnston et al. | |
| 2011/0024585 A1 | 2/2011 | Brinkdopke et al. | |
| 2015/0128491 A1 | 5/2015 | Aller et al. | |
| 2015/0158633 A1 | 6/2015 | Aller et al. | |

* cited by examiner

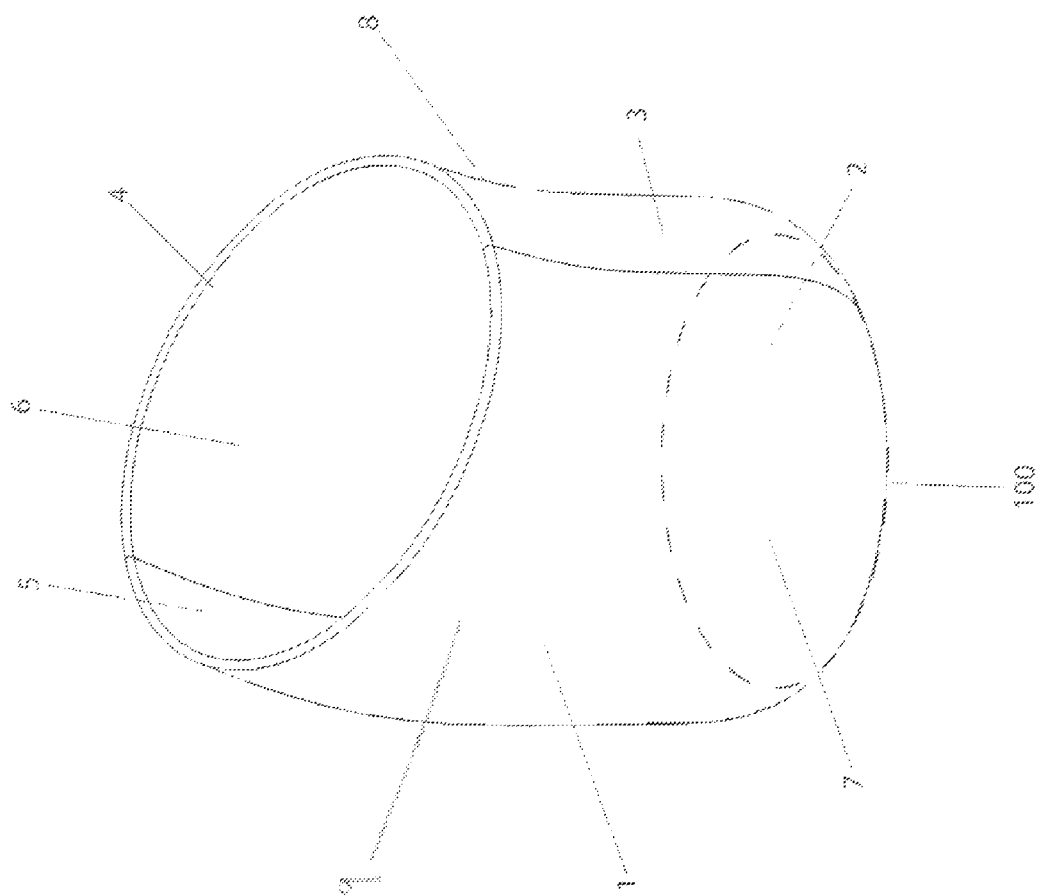

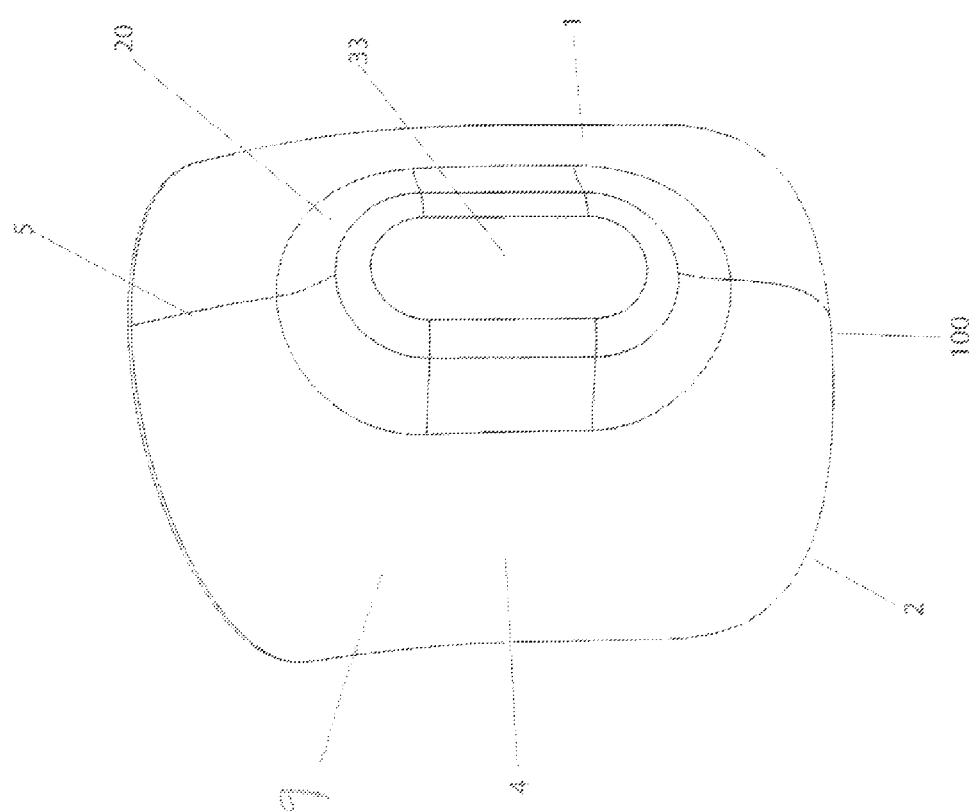

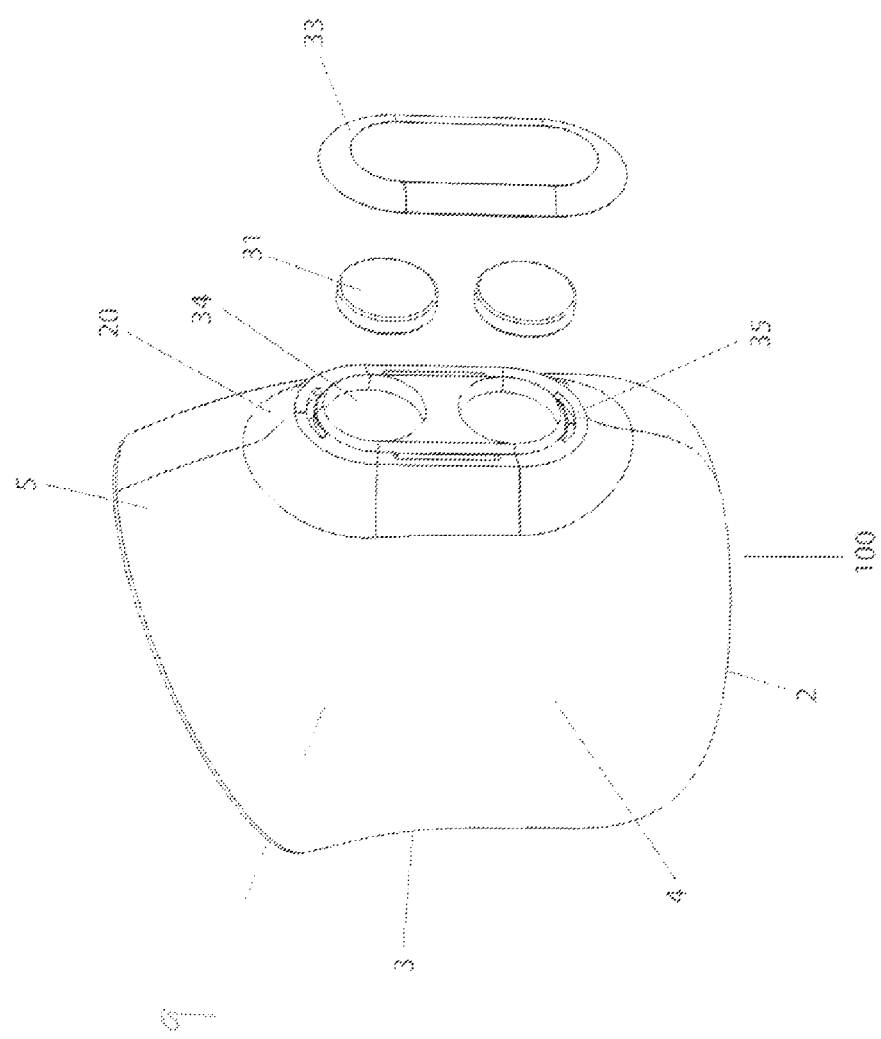

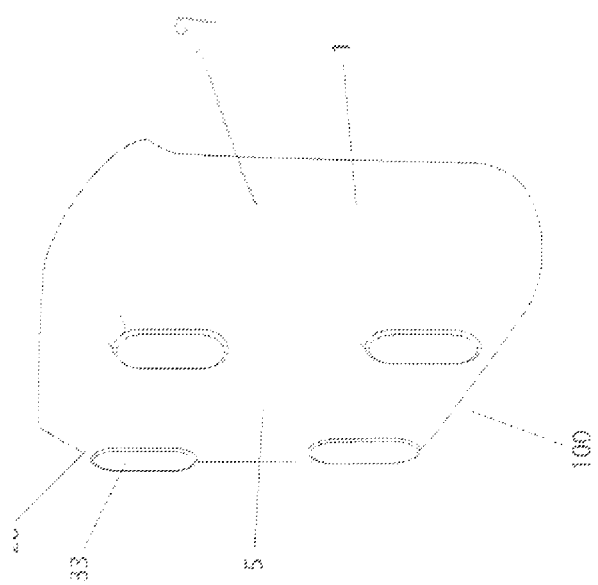
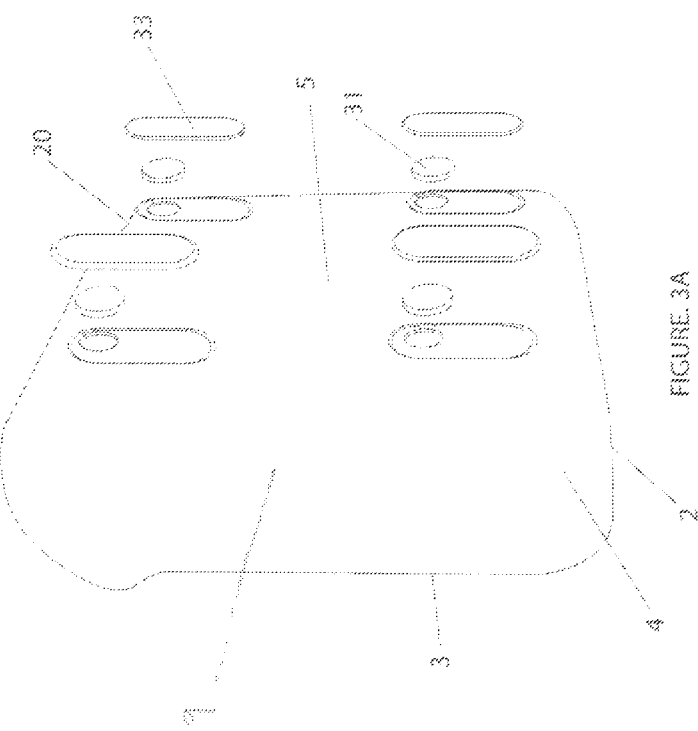

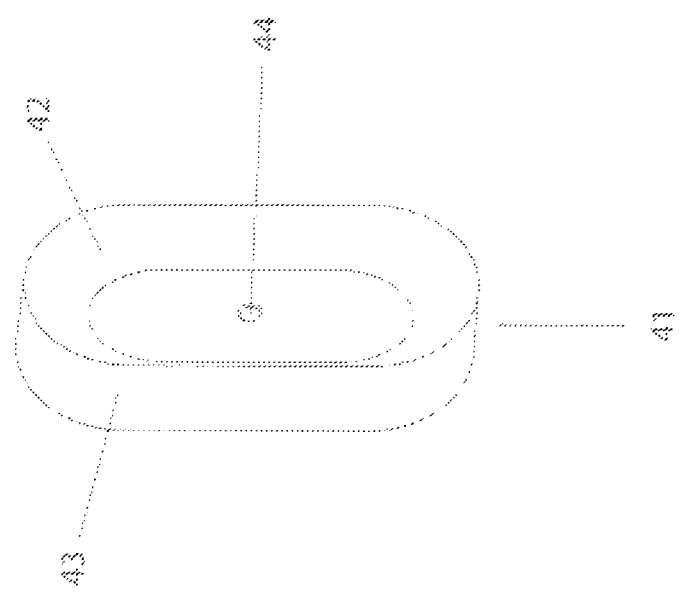

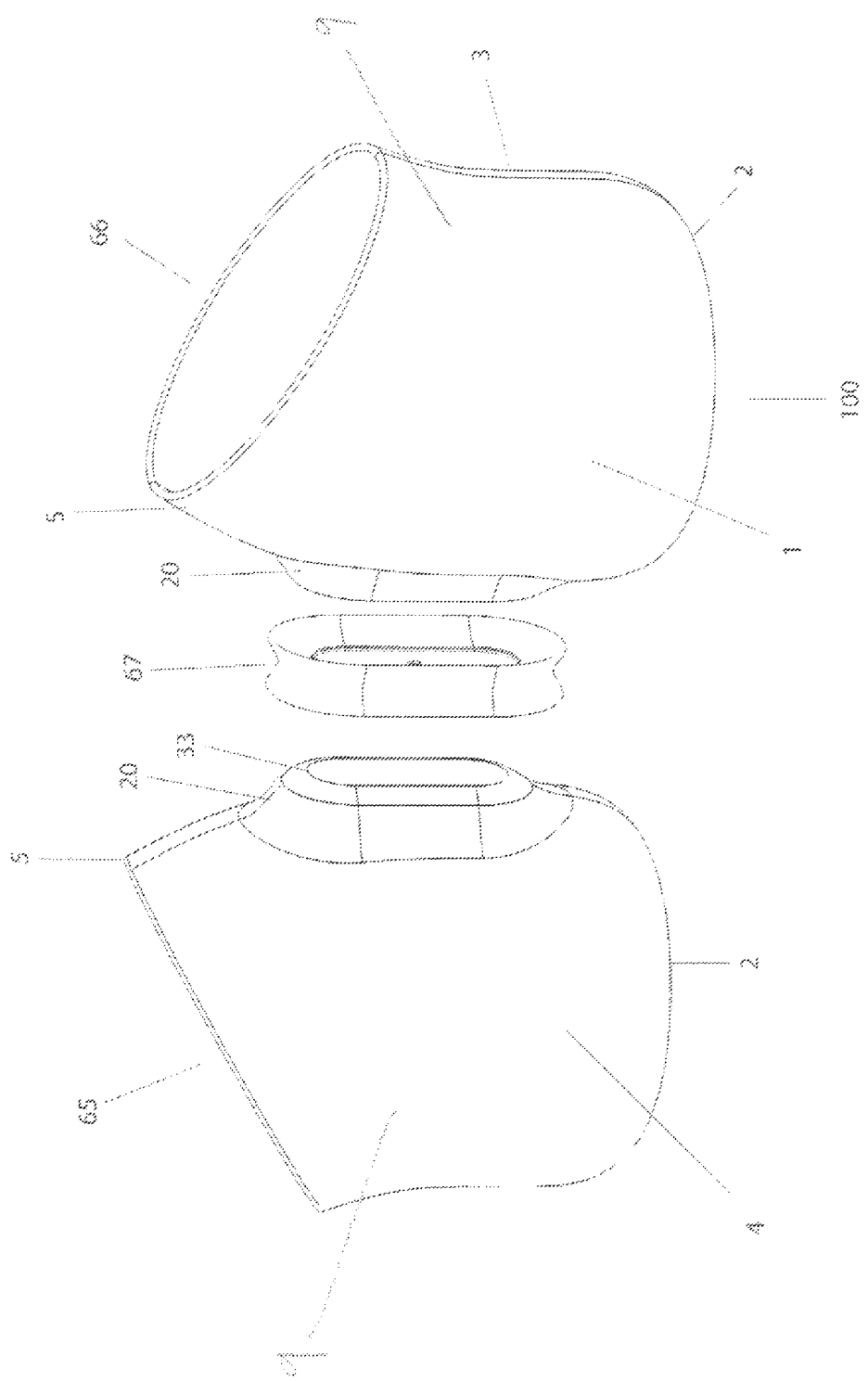

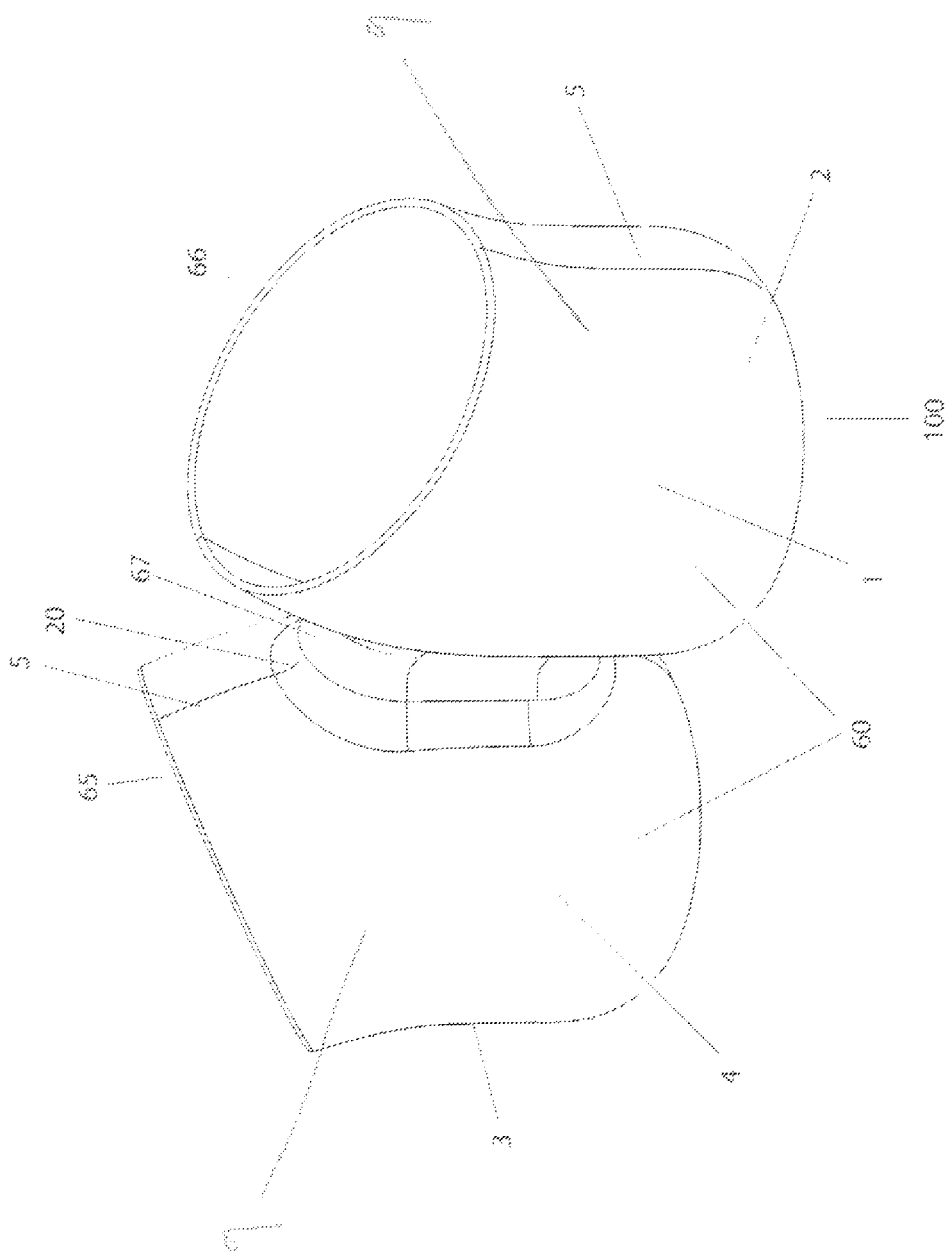

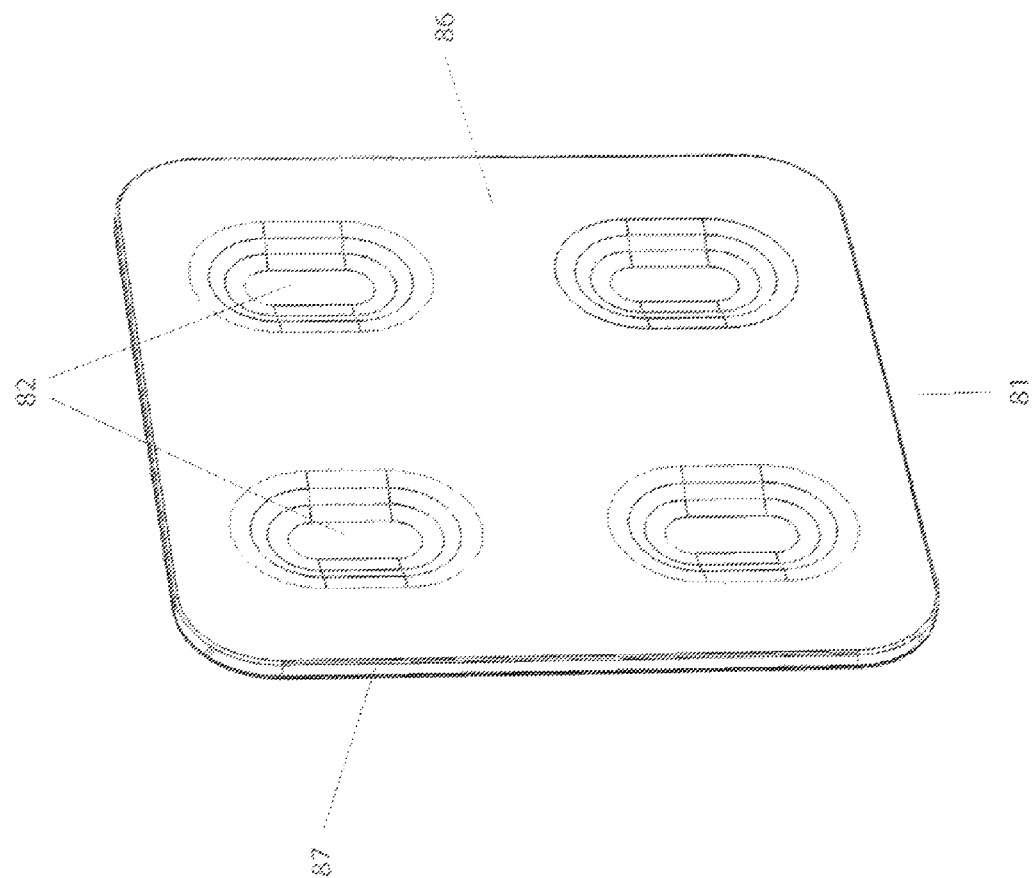

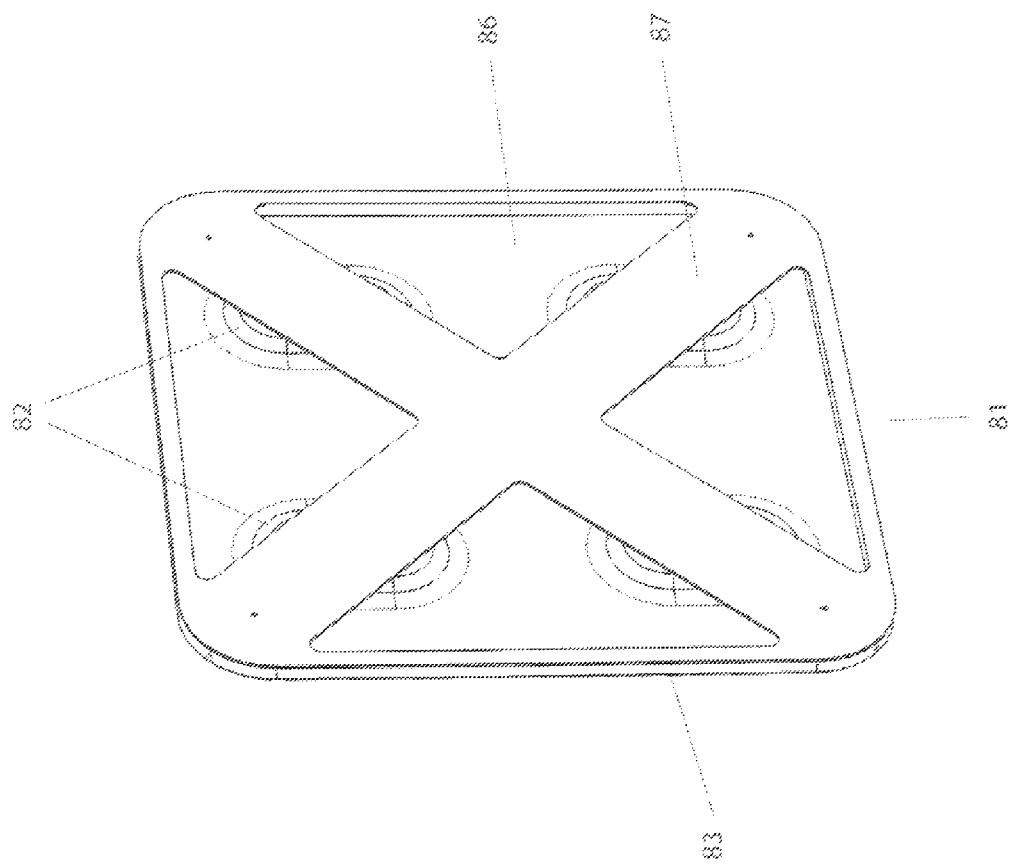

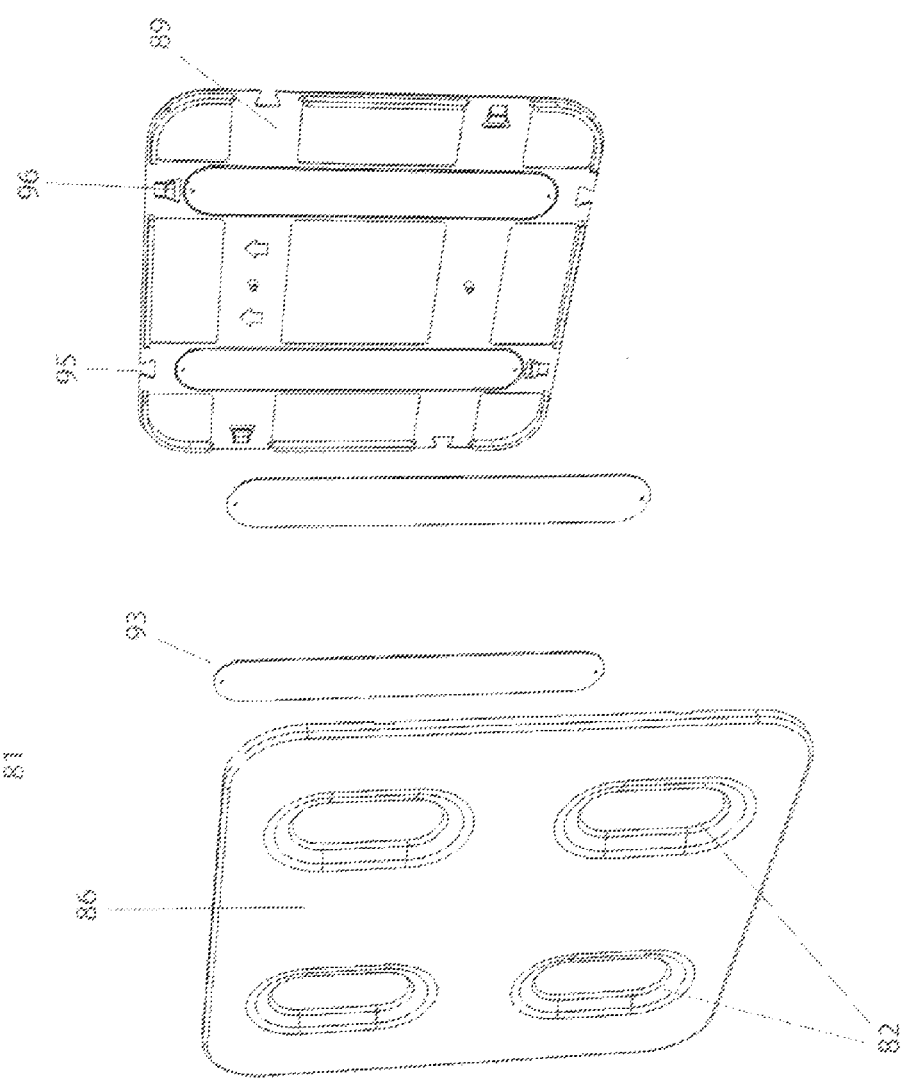

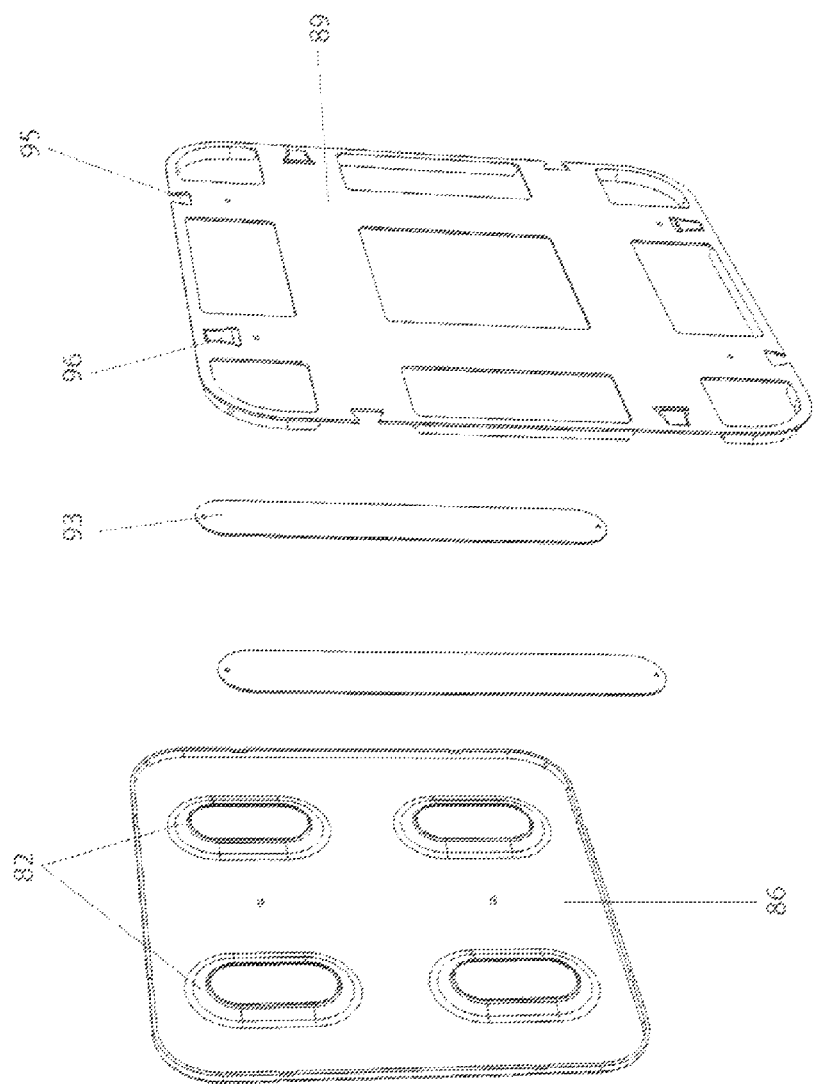

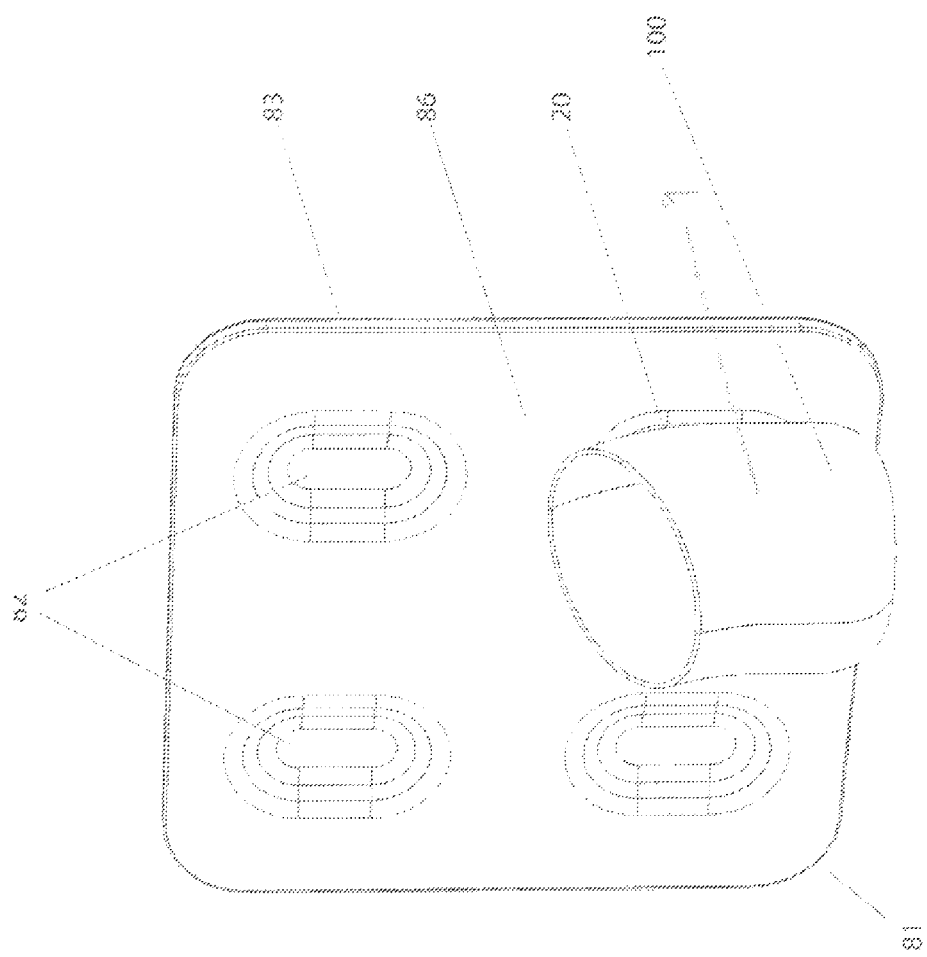

MODULAR MAGNETIC CONTAINER SYSTEM

RELATED APPLICATION

This application claims the benefit under Title 35 of U.S. Provisional Application 61/468,511 filed on Mar. 28, 2011 which is Incorporated herein in its entirety by reference.

TECHNICAL FIELD

The present application relates to modular container systems. In particular, this application relates to modular magnetic container systems for use as storage vessels, such as, for example, vessels suitable for cultivating urban gardens or storing household or office items in a space limited environment.

BACKGROUND OF THE INVENTION

Many people live in dense, urban environments in order to be close to public transportation, employment, or the arts and culture that urban environments have to offer. Dwellings in these urban environments are often small and devoid of green-space. In addition, most dwellings in urban environments are mufti-family buildings of several floors, with several units on each floor. As a result, access to land and soil is very limited, or in some cases non-existent. Furthermore, unless the dwelling has a balcony or patio, there is little, or no, outdoor space. Thus, the ability to grow a garden may be difficult for those that live in urban environments. As a result, they are often forced to forgo owning and maintaining a garden and may feel disconnected with nature.

The transient lifestyle of an urban dweller may also discourage the cultivation of a garden. Urban dwellers often lease their dwellings and may often move from one dwelling to another at the end of their lease in order to be closer to work, friends or family, or in order to secure better lease terms at a different property. As a result, urban dwellers may not be encouraged to grow plants or cultivate a garden because it may be difficult to relocate the garden in the event they move to a different dwelling.

Urban dwellings also may have limited space for storage. While shelving or other storage systems may be used, they are often bulky, heavy, and expensive. Shelving and storage systems may also require complicated installation. Furthermore, shelving and storage systems may require a large amount of wall space, or closet space, to accommodate installation. Since space is at a premium in urban dwellings, current shelving and storage systems may not provide an optimal solution for storing items. In addition, because shelving and storage systems are generally affixed to the dwelling, they are often permanent in nature. Thus, they are not well suited for transient urban dwellers.

It would be desirable to have a modular magnetic container system that overcomes these disadvantages.

SUMMARY OF THE DISCLOSURE

One aspect of the application is the recognition of a need for a modular container system that creates opportunities for facilitating the cultivation of urban gardens and securely storing household or office items in a space limited environment in an aesthetically acceptable and practical manner. The systems, methods, and devices of the application have several aspects, no single one of which is solely responsible for its desirable attributes. Without limiting the scope of the application, certain features will now be discussed briefly. The systems, methods, and devices disclosed herein avoid the problems of past devices while adding functionality, convenience and style.

The present disclosure provides a modular magnetic storage system ("storage system") that may be used to grow plants in an urban environment. In an embodiment of the present invention, the storage system is a container attachable to a surface, the container comprising a vessel having a top end, a bottom end, a wall and a magnet housing, the bottom end being positioned opposite to the top end, the wall extending between the bottom end and the top end, the wall and the bottom end defining a cavity, the top end defining an opening in the vessel, and the magnet housing defining a recess; a magnet disposed within the recess; and a resilient cover positioned over the magnet housing, the resilient cover providing a coefficient of friction between the resilient cover and the surface to maintain a position of the vessel on the surface.

Each vessel can be capable of storing a plant or an object within the cavity. The magnet and magnet covering may together form a vessel-engagement surface. The magnetic poles of the magnet of each vessel may be oriented such that vessel-engagement surface of one vessel may be attracted to the vessel-engagement surface of another vessel, thereby forming a joined vessel unit, or a vessel connector may be used to form a joint vessel unit when the magnetic poles of the magnets of the vessels are of the same polarity. One vessel of sufficient length or width may be attached to one or more smaller vessels.

In another embodiment of the present invention, the container has a first vessel having a first wall and a first magnet housing, the first wall defining a first cavity of the first vessel; a second vessel having a second wall and a second magnet housing, the second wall defining a second cavity of the second vessel; a first magnet disposed within the first magnet housing; a second magnet disposed within the second magnet housing; a first resilient cover being positioned over the first magnet housing; a second resilient cover being positioned over the second magnet housing; and a vessel connector having a first side and a second side positioned opposite to the first side, the first side being sized to matingly receive the first magnet housing, the second side being sized to matingly receive the second magnet housing, both the first magnet and the second magnet being attracted to the vessel connector.

In another embodiment of the present invention, the storage system has a first engagement plate with a surface and a plurality of depressions on the surface; at least one vessel, the vessel having a wall defining a cavity, the vessel having a magnet housing; a magnet, the magnet being disposed within the magnet housing; and a resilient cover, the resilient cover being positioned over the magnet housing; wherein each of the plurality of depressions is sized to matingly receive the magnet housing, and the magnet is attracted to the first engagement plate.

The storage system may also comprise one or more brackets comprising a wall hanging means for hanging the engagement plate on a wall or other vertical surface. The one or more brackets may comprise a bracket-engaging surface that engages other brackets of the one or more back-plates.

Additional features and advantages of the systems and methods disclosed in the present application will become apparent upon review of the drawings and descriptions provided herein.

BRIEF DESCRIPTION OF THE DRAWINGS

The following figures illustrate systems and methods in accordance with some exemplary embodiments of the application.

FIG. 1 shows a freestanding mountable embodiment of a vessel of a modular magnetic storage system.

FIG. 2 shows another embodiment of a vessel of a modular magnetic storage system with a magnetic housing and cover.

FIG. 3 shows an exploded view of a vessel of a modular magnetic storage system.

FIG. 3A shows a detailed view of a vessel of a modular magnetic storage system with multiple housings displayed.

FIG. 3B shows the finished product of a vessel of a modular magnetic storage system with multiple housings.

FIG. 4 shows one embodiment of a vessel connector and single vessel wall mount.

FIG. 5 shows one embodiment of a modular magnetic storage system including a vessel connector facilitating the attachment of a first vessel to a second vessel.

FIG. 6 shows an additional embodiment of a modular magnetic storage system with a first vessel attached to a second vessel through use of a vessel connector.

FIG. 8A shows one embodiment of a back-plate with four depressions.

FIG. 8B shows a perspective from the side of the back plate that interfaces with the attaching surface.

FIG. 9A shows a back-plate separated into individual components including a wall mount and at least one bracket.

FIG. 9B shows another perspective of a back-plate separated into individual components including a wall mount and at least one bracket.

FIG. 10 is a front view of one embodiment of a modular magnetic storage system with a vessel attached to a back-plate.

DETAILED DESCRIPTION OF SOME PREFERRED EMBODIMENTS

Figure 7C:
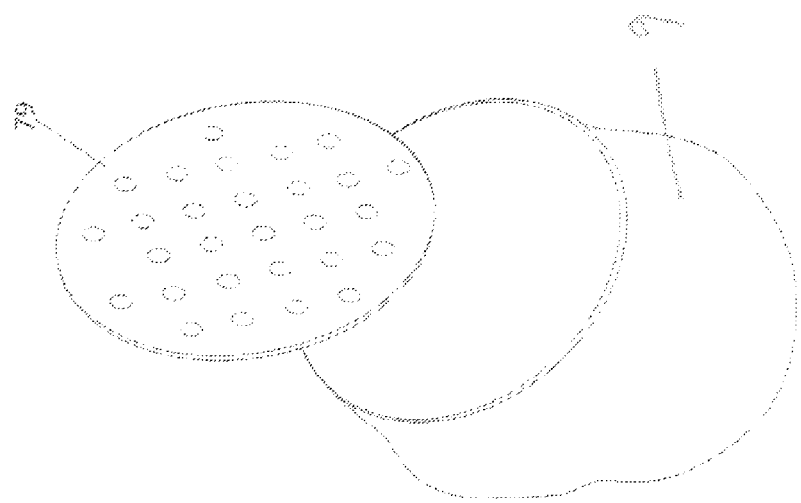
FIG. 7C shows another embodiment of a vessel of a modular magnetic storage system with the holed separator outside of the vessel.

FIG. 1 shows one embodiment of a vessel 100 of a modular magnetic storage system. The vessel 100 comprises a bottom end 7 and a top end 8. The bottom end 7 and the top end 8 are joined by a wall 9. In one embodiment, the wall 9 may include a front wall 3, a first sidewall 1, a second sidewall 4, and a back wall 5. The wall 9 together with the bottom end 7 define a cavity 6 for storing objects. In one embodiment, the front wall 3, first sidewall 1, second sidewall 4 and back wall 5 are joined with the bottom end 7 to form such a cavity 6 for storing objects. In one embodiment, the cavity 6 is sufficient to store a plant, flower, herb, or some other botanical object. In the same or different embodiments, the cavity 6 may be sufficient to store other objects such as, for example, kitchen utensils, office supplies, bathroom items, etc. The floor wall 2 comprises the bottom end 7 of the vessel. The top end 8 is located at the opposing end of the vessel 100 from where the bottom end 7 is located.

The wall 9 of the vessel may be made of a lightweight material. For example, in one embodiment, the wall 9 may be made of plastic. In other embodiments, the plastic may be an eco-plastic or some other environmentally friendly or biodegradable plastic material. In another embodiment, the wall 9 of the vessel may be made of a waterproof or weatherproof material allowing for outdoor, as well as indoor, use. In some embodiments, the wall 9 of the vessel may be made of cellulose.

The vessel 100 may be of any size or shape sufficient to store objects or plants. In one embodiment, each wall of the vessel may be approximately the same shape and size, thus forming a cube like vessel. In another embodiment, the lengths of first sidewall 1 and second sidewall 4 of the vessel may be much longer than the width of the front wall 3 and the back wall 5 thereby forming a vessel that is taller than it is wide. In another embodiment, the widths of the first sidewall 1 and second sidewall 4 may be much shorter the widths of the front wall 3 and the back wall 5 thereby forming a vessel that is wider than it is tall. In another embodiment, the front wall 3 may be shorter in length than the back wall 5 thereby forming a vessel with sloped sidewalls, as see in FIG. 1. It can be appreciated that any shape can be formed by adjusting the lengths and widths of the walls of the vessel to form a vessel capable of accommodating many different plants or objects.

In one embodiment the first sidewall 1 and the second sidewall 4 may be curved or concave, giving the vessel a rounded or curved appearance, as in FIG. 1. The intersection of the sidewalls and the front wall 3 and back wall 5 with the floor wall 2 may also be curved or concave giving the entire vessel a spherical or ellipsoidal appearance, as can be seen in FIG. 1. In another embodiment, the intersection of the sidewalls and the front and back wall with the floor wall may be at right angles giving the vessel a square or box-like appearance. It can be appreciated that the walls may be of any acceptable shape such that when they are joined they form a space suitable for storing a plant or other object.

In one embodiment, the floor wall 2 of the vessel may be substantially flat, or parallel to the ground, so that the vessel may support itself while sitting on a flat surface such as a table, desk, counter, or floor.

FIG. 3 shows another embodiment of the modular magnetic storage system. As shown in FIG. 3, the back wall 5 of the vessel may comprise a magnetic housing or a detent 20. The magnetic housing 20 houses a magnet 31. The magnetic housing 20 may be of sufficient size and shape such that the magnet 31 may lie within the housing. The magnetic housing 20 may be of sufficient size and shape such that the magnet 31 is disposed entirely within the magnetic housing 20 such that no portion of the magnet 31 extends beyond the plane of the back wall 5 of the vessel 100. In other embodiments, a portion of the magnet 31 may extend past the plane of the back wall 5. In some embodiments, the back wall 5 of the vessel may contain additional cavities to house additional magnets. The magnet 31 may be attached to the vessel 100 in order to attach the vessel to any surface to which magnets may attach (for example, ferrous surfaces). Such a surface may be, for example, a surface made of iron. The magnet 31 may also be covered by a resilient magnet cover 33.

As shown in FIG. 2, the magnet 31 may be disposed in the magnetic housing 20 of one of the walls of the vessel 100. The magnet 31 may be attached by glue, screws or some other attachment means known in the art. In one embodiment, the magnet housing 20 is attached to the back wall 5 of the vessel 100; however, in other embodiments the magnet housing 20 may be attached to the first sidewall 1, the second sidewall 4 or the front wall 3 or the floor wall 2 of the vessel. The magnet housing 20 may be attached to the vessel by glue, screws or some other attachment means known in the art including being embedded in the wall. In one embodiment of the invention, the magnet housing 20 is shaped as a rounded isosceles trapezoid prism, such that the top plane and the base plane are elongated ellipses. In this manner, each end of the magnet housing 20 can fit a circular shaped magnet 31.

FIG. 3A shows an exploded view of one embodiment of a vessel 100 of a modular magnetic storage system comprising more than one magnet housing 20. As the size of the vessel increases, additional magnets may be added to provide additional magnetic force to support the weight of the objects disposed within the cavity formed by the walls of the vessel. A wall 9 may comprise multiple magnet housings 20. By way of example in FIG. 3A, the back wall 5 of the vessel comprises four magnet housings 20. The vessel comprises four magnets 31, each disposed within a recess 34 of the magnet housings. Each also comprises a resilient cover 33 disposed on the back wall 5 such that the resilient cover 33 completely covers the magnet 31. In one embodiment, the magnets may be neodymium magnets. However, in other embodiments, the vessel 100 may comprise magnets that are not neodymium.

The resilient cover 33 may be constructed of a material allowing for sufficient transfer of magnetic force from the magnet to the surface to which the vessel may be attached. The material may allow sufficient transfer of force to support the weight of the plant or object situated within the cavity formed by the wall 9 coming together with the floor wall 2. As noted above, the wall 9 may comprise the front wall 3, the first and second sidewalls 4, 1, and the back wall 5. The resilient cover 33 may, for example, be constructed of a material that provides the vessel 100 with a coefficient of friction when the vessel is attached to a surface. As discussed above, one embodiment of the invention provides for the magnet housing to attach to a ferrous material, the magnet housing using the magnets disposed inside to attach to the ferrous material. The resilient cover may further be comprised of a material with a coefficient of friction such that the vessel can attach to the surface better than if the resilient cover did not have a material with a coefficient of friction. Thus, with the resilient cover comprising a material with a coefficient of friction, the strength of the vessel to attach to a surface is increased. In one embodiment, the resilient cover may comprise rubber, such as natural or synthetic rubber, in some embodiments. The resilient cover 33 may be the same color as the vessel, or in other embodiments, may be of a contrasting or complementary color for aesthetic purposes. The resilient cover 33 may be attached to the vessel by glue, screws or some other attachment means known in the art. In one embodiment, the resilient cover 33 is attached to the magnet housing 20 by means of a tab 35 attached to the magnet housing 20 that snaps into the resilient cover 33. In some embodiments, more than one resilient cover 33 may be attached to the vessel 100 in order to cover more than one magnet. In one embodiment, the resilient covers 33 may be made of molded rubber, but in other embodiments, the resilient covers may be made of some other material allowing transfer of the magnetic force of the magnets.

FIG. 3B shows the vessel 100 with multiple magnet housings in finished form with the magnet hidden from view by a resilient cover 33.

Returning to FIG. 2, the vessel may also comprise a vessel-engagement surface. The vessel-engagement surface may be the surface of the vessel that engages, or connects, with other objects. In one embodiment, the vessel may engage any ferrous material. In another embodiment, the vessel may attach to a back-plate of a modular magnetic storage system. The vessel-engagement surface may attach to any surface capable of accepting a magnet. The vessel-engagement surface may be comprised of the magnet housing that attracts to other magnets or ferrous materials.

FIG. 4 shows an embodiment of a vessel connector 41. In one embodiment, the vessel may attach to another vessel through the use of a vessel connector 41. In one embodiment of the modular magnetic storage system, a vessel connector 41 may be used to connect two vessels comprising magnets of the same polarity. The vessel connector 41 may comprise a first engagement surface 42 and a second engaging surface 43. In one embodiment, the polarity of the magnets of a first vessel may be of opposite polarity from the polarity of the vessel connector. For example, in one embodiment, the first vessel may contain north polarized magnets while the vessel connector may contain south polarized magnets. In another embodiment, the vessel connector can comprise a ferrous material, allowing for a first vessel of one polarity to attach to a second vessel of the same polarity.

In another embodiment, the vessels of the modular magnetic storage system may be designated as a certain polarity such that a vessel connector is not necessary. In such an embodiment, some vessels may be "north polarity" vessels, while others may "south polarity" vessels. In such embodiments, only vessels of opposite polarity (i.e. north and south) may engage. In yet another embodiment, the vessel connector 41 can include two magnetically isolated plates of ferrous material, so that one vessel can be connected to one plate and the other vessel connected to the other plate regardless of the magnetic orientation of each vessel.

FIG. 6 shows another embodiment of a modular magnetic storage system where a first vessel 65 is connected to a second vessel 66 to form a joined vessel unit 60. The joined vessel unit 60 of FIG. 6 comprises two vessels. As can be seen in FIG. 6, but also in the more detailed FIG. 5, the wall 9 of the first vessel 65 comprises a magnetic housing 20 whereby at least one magnet is disposed in the housing. The magnets of the first vessel 65 are covered by a resilient cover 33 as described above. The wall 9 of the second vessel 66 similarly comprises a magnetic housing 20 which houses at least one magnet 31. The two vessels are joined with a vessel connector 67. While in this embodiment, the two vessels are of substantially similar sizes, it can be appreciated that vessels of the different sizes may be attached to form a joined vessel unit 60, as shown in FIG. 6. In another embodiment, more than two vessels may be joined. For example, a vessel that is longer than it is tall may comprise several magnets along with several vessel engagement surfaces. For example, in another embodiment, one vessel may have four magnets and four associated vessel engagement surfaces allowing for joined vessel unit of up to five vessels.

Figure 7B:
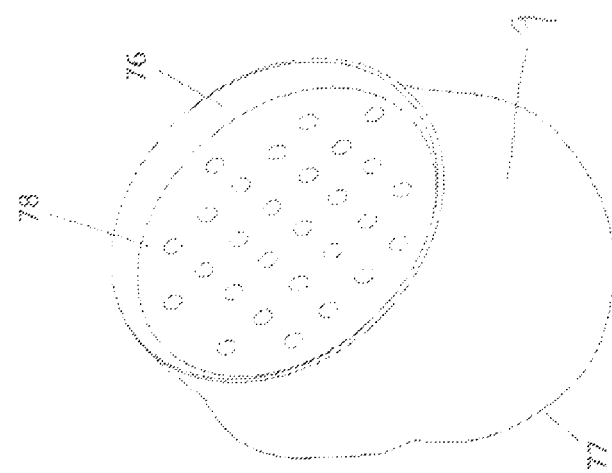
FIG. 7B shows another embodiment of a vessel of a modular magnetic storage system with a holed separator approaching the top end of the vessel.
Figure 7A:
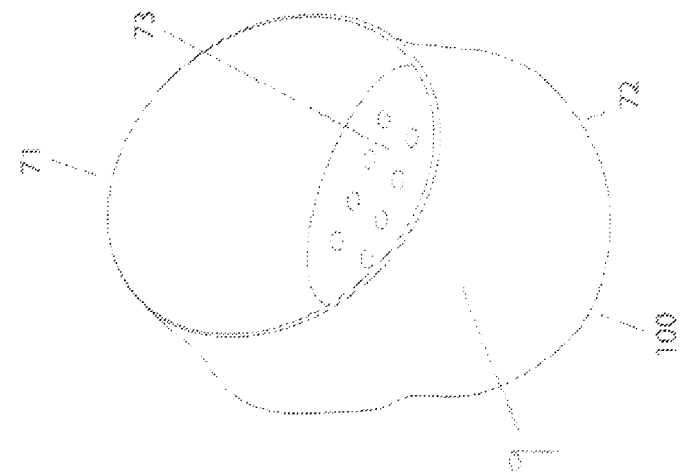
FIG. 7A shows one embodiment of a vessel of a modular magnetic storage system comprising a lower chamber and an upper chamber through use of a holed separator.

FIG. 7A shows one embodiment of a vessel 100 of a modular magnetic storage system wherein a cavity formed by the walls of the vessel comprises a lower chamber 72 and an upper chamber 71 separated by a holed separator 73. A holed separator 73 is positioned within the cavity, the separator 73 dividing the cavity into an upper chamber 71 and a lower chamber 72, the separator having a plurality of holes therethrough. In some embodiments, as discussed above, a vessel may store a plant. In one embodiment, the upper chamber 71 of the vessel may house soil in which a plant grows. The soil of the upper chamber 71 may sit on top of a holed separator 73. If a plant is over watered, the excess water will fall through the holes of the holed separator 73 and into the lower chamber 72.

FIG. 7B shows another embodiment of the holed separator 78 in a different position such that the lower chamber 77 and the upper chamber 76 are both of a different capacity than the chambers shown in FIG. 7A because the holed separator 78 is positioned differently. FIG. 7C shows the vessel with the holed separator 79 being taken out of the vessel altogether.

FIG. 8A shows one embodiment of an engagement plate 86. The engagement plate 86 may be attached to a bracket 87 forming a back-plate 81. The back-plate may then be attached to a wall. In other embodiments, the back-plate 81 may be attached to a room divider, a door, or some other vertical structure. In one embodiment, the engagement plate 81 is made of steel. In other embodiments, the engagement plate 86 may be made of a different ferromagnetic material.

In one embodiment, the engagement plate 86 may have one or more depressions 82 comprising an engagement plate 86. The depressions 82 of the engagement plate 86 may be substantially the same size and shape as the magnet housing surfaces of the vessels. In some embodiments, the depressions 82 of the engagement plate 86 may be of the same size, shape and depth to house the vessel-engagement surface such that the magnetic housing and the engagement plate depressions matingly engage, forming a flush fit between the engagement plate and the vessel.

In another embodiment, a vessel connector 41 of FIG. 4 may be used as an engagement plate for a single vessel unit. A first surface area 43 may be used to attach to a surface area while the second surface area 42 may engage with the vessel. The vessel connector 41 may comprise a fastener hole 44 extending entirely through the vessel connector 41 from the first surface area 43 to the second surface area 42.

FIG. 8B illustrates an embodiment of the back-plate 81 capable of engaging with a wall or other substantially flat surface. The engagement plate 86 may attach to a bracket 87. In one embodiment, the bracket 87 may be disposed along the edge 83 of the engagement plate 86. The bracket 87 may comprise a hooking surface for providing a snap-fit with an engagement plate 86 of the modular magnetic storage system. In another embodiment, the bracket 87 may be disposed somewhere other than the edge of the engagement plate 86. In such embodiments, the bracket 87 may provide a snap-fit to secure the engagement plate 86 to the bracket 87. In other embodiments, a fastener such as a screw or a nail may be used to attach the bracket 87 to the engagement plate 86.

Figure 8C:
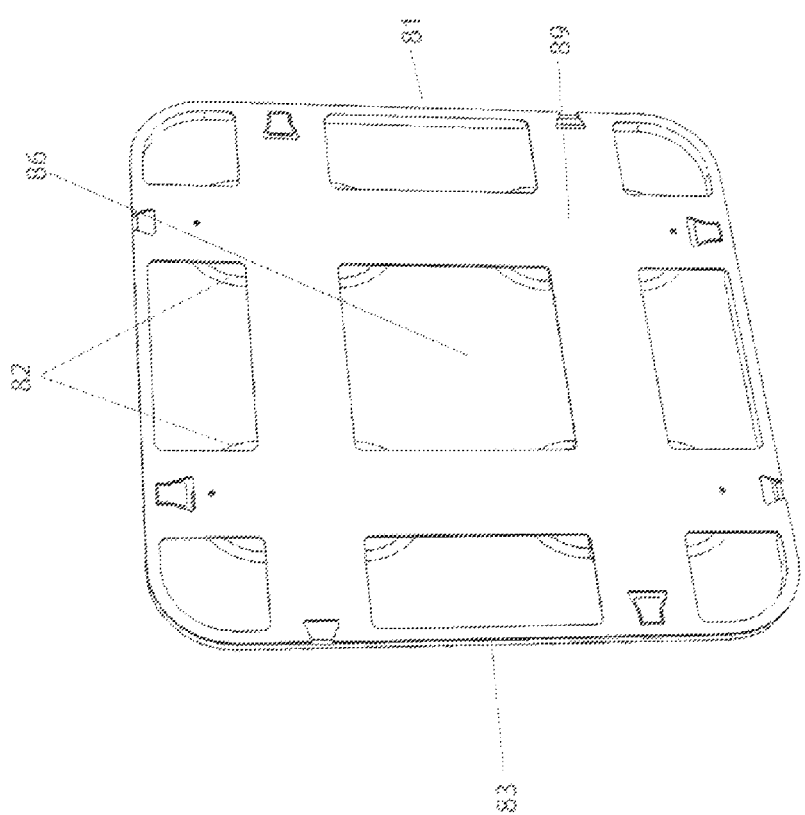
FIG. 8C shows an exploded perspective from the side of the back plate that interfaces with the attaching surface including at least one bracket.

FIG. 8C illustrates an embodiment where the bracket member 89 runs parallel and perpendicular to the depressions 82 of the engagement plate 86. In some embodiments, the square bracket member 89 may be disposed along the edge of the engagement plate 86 as part of the back-plate edge 83. In such embodiments, the bracket member 89 may be shaped in a hook like fashion so it may easily be snapped onto the engagement plate. In other embodiments, the bracket member 89 may take any shape allowing a snap fit. In some embodiments, the bracket member 89 may be made of a flexible material, such as plastic, allowing it to give while sliding it over the engagement plate 86 and then slide back into place once it passes the bracket.

FIGS. 9A and 9B show close up and exploded views of one embodiment of a back-plate 81 of a modular magnetic storage system. In some embodiments, the modular magnetic storage system may comprise one or more brackets 89 comprising a wall hanging means for hanging engagement plates 86 on a wall or another vertical surface. The wall hanging means may comprise any means of fastening a bracket 89 to a wall known in the art such as glue, screws, nails, tape, etc. The one or more engagement plates 86 may comprise a bracket-engagement surface 93 that engages the bracket 89 of the one or more engagement plates 86.

In some embodiments, the bracket 89 may provide for more than one engagement plate 86 to be attached to a set of brackets. For example, the length of one bracket may be equal, or slightly less than, the length of two engagement plates allowing for two engagement plates to be attached to one bracket. Brackets may be of varying length and allow any number of engagement plates to be attached. The brackets may provide, in some embodiments, connections to interface with other brackets. For example, FIG. 9A shows a tab connector 96 facing the engagement plate 92. An acceptor 95 allows for the tab connector 89 to connect one bracket to another bracket such that it may appear that multiple smaller back-plates comprise one larger back-plate. The modular magnetic storage system comprising multiple back-plates and vessels may be used to create a customizable storage system.

The plate 92 of FIG. 9A can be made of stamped steel. However, as noted above, plates 92 may be made of any ferromagnetic material. In some embodiments, the plate 92 may be powder-coated, while in other embodiments, the plate 92 may be painted, or left without a coating.

The use of magnets in the vessels allows for simple engagement and disengagement. FIG. 10 illustrates a vessel 100 mounted on an engagement plate 86, as described above. Each vessel 100 may be easily disengaged from the one or more engagement plates 86 by pulling the vessel away from the engagement plates 86 to disengage the vessel. Once removed, the vessel may be filled with an object, such as soil in order to plant a plant, flower, herb, or the like. The vessel 100 may then be remounted to the one or more engagement plates 86 by engaging the magnet housing 20 surface with the engagement plate depression 82 surface. As noted above, the engagement plate will attract the magnet or magnets of the vessel and will hold the vessel in place once engaged. In some embodiments, the vessel may store a plant. In these embodiments, the vessel may be easily mounted and dismounted from one or more back-plates, for example, to water the plant stored in the vessel. In other embodiments, a vessel may be engaged to one or more of the other vessels to form a joined vessel unit. As noted above, this may be through the use of a vessel connector. The vessels can easily be disengaged by pulling the vessels away from each other to provide easier handling. For example, the vessels may be disengaged to water the plants each vessel may be storing. In addition, the use of magnets allows for easy rearrangement of one or more vessels on one or more back-plates. In other embodiments, the vessels may be freestanding and not attached to another vessel or a back-plate (see, for example, FIG. 1). In some embodiments freestanding vessels may be used for a time in the freestanding configuration and then returned to a mounted storage position on a wall or ferrous surface.

It can be appreciated that several combinations of free standing vessels, joint vessel units, and vessels mounted on one or more back-plates may be achieved by the modular magnetic storage system. In one embodiment, the arrangement of the modular magnetic storage system may be changed easily by engaging and disengaging the vessels to one another, or the one or more back-plates, or by freestanding a vessel. The use of magnets allows for easy engagement and disengagement of the components (for example, vessels, back-plates and/or vessel connectors) of the modular magnetic system to create any arrangement a user desires. In addition, as noted above, the vessels may be attached to any ferrous surface, such as for example, a refrigerator as shown in FIG. 10. Thus, even non-components of the modular magnetic storage system may be utilized in the arrangement of the system providing the user an adaptable storage solution that may be customized to satisfy the user's needs. While embodiments shown and described herein may include a magnet coupled to the vessel, in some other embodiments, a back-plate or other surface may comprise one or more magnets and one or more vessels may comprise a ferrous surface for being coupled to the back-plate or other magnetic surface. Additionally, while magnets and ferrous surfaces have been shown and described for coupling modular vessels, in some other embodiments modular vessels for containing plants or other items may be coupled with a back-plate, another surface, or another modular vessel by other mechanical coupling features.

The various systems and methods described above provide a number of ways to carry out some preferred embodiments of the invention. Of course, it is to be understood that not necessarily all objectives or advantages described may be achieved in accordance with any particular embodiment described herein. Thus, for example, those skilled in the art will recognize that the combinations may be made and the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Similarly, the various components, features and steps discussed above, as well as other known equivalents for each such component, feature or step, can be mixed and matched by one of ordinary skill in this art to make components and perform methods in accordance with principles described herein.

Although the invention has been disclosed in the context of some embodiments and examples, it will be understood by those skilled in the art that the invention extends beyond these specifically disclosed embodiments to other alternative embodiments and/or uses and obvious modifications and equivalents thereof. Accordingly, the invention is not intended to be limited by the specific disclosures of preferred embodiments herein.

We claim:

1. A container attachable to a surface, the container comprising:
   a vessel having a top end, a bottom surface end, a wall and a magnet housing, the bottom surface end being positioned opposite to the top end, the wall extending between the bottom surface end and the top end and wherein the wall includes a front wall and a back wall oppositely disposed from the front wall and said wall further defined as having a first sidewall and a second sidewall oppositely disposed from the first sidewall and both the first and second sidewalls separately disposed between the front and back walls, and wherein the first and second sidewalls are curved away from the back wall and wherein the front wall is shorter than the back wall, such that the vessel has a top portion about the top end that is curved forward with the back wall extending higher than the front wall and wherein the wall and the bottom surface end further defining a cavity, the top end defining an opening in the vessel, and the magnet housing defining a recess, and the magnet housing being positioned on the back wall between the top end and the bottom surface end,
   and wherein the front wall is further configured as having a concave portion extending below the top end towards a region centrally defined between the top end and the bottom surface end, and the back wall is further configured as having a convex portion extending between the top end and the magnet housing such that a top portion of the vessel below the top end is bowed such that the container leans away from the back wall and towards the front wall wherein an object such as a plant placed within the vessel is configured for display away from the back wall;
   a separator sized to be positioned within the vessel at any location intermediate the top end and the bottom surface end without attachment to the wall, the separator dividing the cavity into an upper chamber and a lower chamber, the separator having a plurality of holes therethrough;
   a magnet disposed within the recess; and
   a resilient cover positioned over the magnet housing, the resilient cover providing a coefficient of friction between the resilient cover and the surface to maintain a position of the vessel on the surface, and wherein the bottom surface end of the vessel is substantially horizontal and has a free external periphery surface around the entire bottom surface end that remains unattached to the surface.

2. The container of claim 1, further comprising:
   a tab for attaching the resilient cover to the vessel.

3. The container of claim 1, wherein the coefficient of friction between the resilient cover and the surface is larger than a coefficient of friction between the magnet and the surface.

4. The container of claim 1 wherein the magnet is a neodymium magnet.

5. The container of claim 1 wherein the vessel is constructed from a material selected from the group consisting of plastic, cellulose, eco-plastic, and combinations thereof.

6. The container of claim 1, further comprising:
   a vessel connector having a first side and a second side positioned opposite to the first side, the first side being sized to matingiy receive the magnet housing, the magnet being attracted to the vessel connector; and
   a fastener hole defining an orifice that extends entirely through the vessel connector from the first side to the second side.

7. A container system, the container system comprising:
   a first vessel having a first wall and a first magnet housing, the first wall defining a first cavity of the first vessel;
   a second vessel having a second wall and a second magnet housing, the second wall defining a second cavity of the second vessel;
   a first magnet disposed within the first magnet housing;
   a second magnet disposed within the second magnet housing;
   a first resilient cover being positioned over the first magnet housing;
   a second resilient cover being positioned over the second magnet housing;
   a vessel connector having a first side and a second side positioned opposite the first side, the first side being sized to matingly receive the first magnet housing, the second side being sized to matingly receive the second magnet housing, both the first magnet and the second magnet being attracted to the vessel connector; and wherein either one or both of the first or second vessels being configured to have the first or second wall defined as a surrounding wall disposed between the top and bottom surface ends defined as having a front wall and a back wall oppositely disposed form the front wall and said surrounding wall further defined as having a first sidewall and a second sidewall oppositely disposed from the first sidewall and both the first and second sidewalls separately disposed between the front and back walls, and wherein the first and second sidewalls are curved away from the back wall and wherein the front wall is shorter than the back wall, such that the first or second vessel has a top portion about the top end that is curved forward with the back wall extending higher than the front wall, and wherein the front wall is further configured as having a concave portion extending below the top end towards a region centrally defined between the top end and the bottom surface end, and the back wall is further configured as having a convex portion extending between the top end and a position of the magnet housing defined thereon such that a top portion of the vessel below the top end is bowed such that the container leans away from the back wall and towards the front wall wherein an object such as a plant placed within the vessel is configured for display away from the back wall, and wherein the bottom surface end is substantially horizontal and has a free external periphery surface around the entire bottom surface end that remains unattached to the vessel connector.

8. The container system of claim 7 wherein the second magnet has a polarity that is opposite to a polarity of the first magnet.

9. The container system of claim 7, further comprising:
a first tab for attaching the first resilient cover to the first magnet housing; and
a second tab for attaching the second resilient cover to the second magnet housing.

10. The container system of claim 7 wherein the vessel comprises a ferrous material.

11. The container system of claim 7, further comprising:
a fastener hole defining an orifice that extends entirely through the vessel connector from the first side to the second side.

* * * * *